May 20, 1969 C. GUNN-RUSSELL 3,445,671
PHOTOELECTRIC DEFECT DETECTOR WITH INDEPENDENT CONTROL
OF WIDTH AND LENGTH OF DEFECTS
Filed Oct. 14, 1965 Sheet 1 of 3
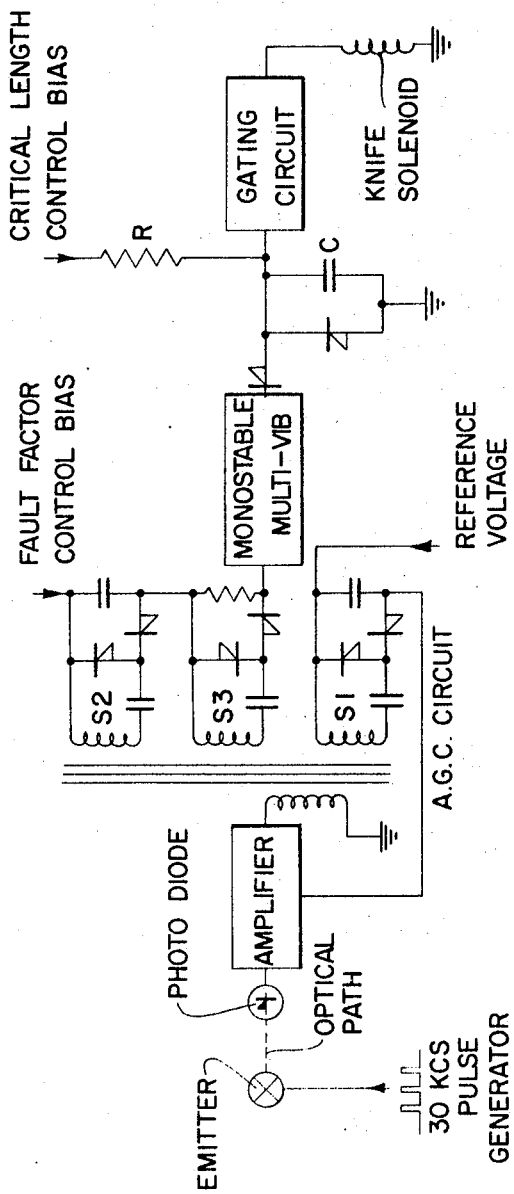
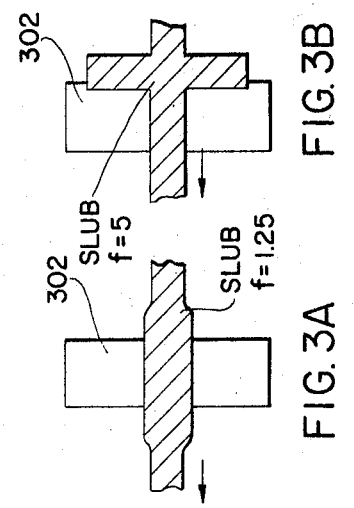
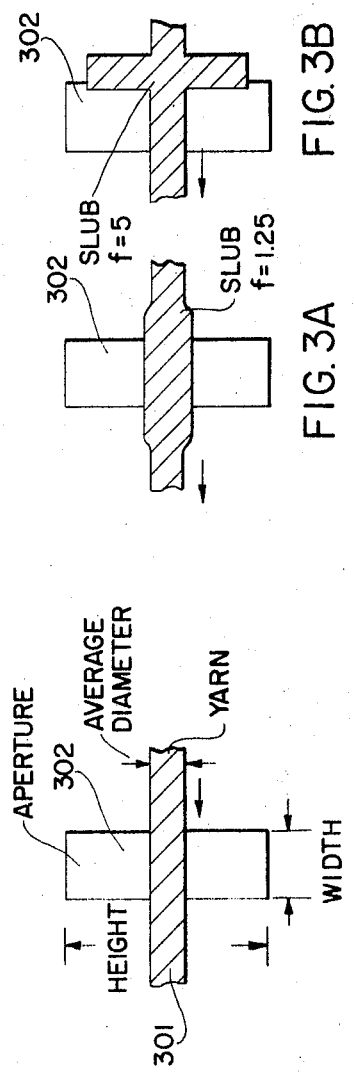
INVENTOR.
CHARLES GUNN-RUSSELL
BY
ATTORNEYS

United States Patent Office 3,445,671
Patented May 20, 1969

3,445,671
PHOTOELECTRIC DEFECT DETECTOR WITH INDEPENDENT CONTROL OF WIDTH AND LENGTH OF DEFECTS
Charles Gunn-Russell, London, England, assignor to Leesona Corporation, Warwick, R.I., a corporation of Massachusetts
Filed Oct. 14, 1965, Ser. No. 495,877
Claims priority, application Great Britain, Oct. 16, 1964, 42,343/64; Oct. 29, 1964, 44,208/64
Int. Cl. G01n 21/30
U.S. Cl. 250—219
14 Claims

ABSTRACT OF THE DISCLOSURE

Apparatus scans yarn in motion to photodetect slubs in the yarn of either excessive width or excessive length and provide electrically processed signals for operating a cutter when an unacceptable slub is found. Bias controls permit the apparatus to work at different speeds and for different slub dimensions.

---

The present invention relates to apparatus for the scanning of yarn or other linear material for the detection of irregularities. An example of the application of such apparatus is to the scanning of yarn for the detection of faults such as slubs or spinners doubles, a control output from the apparatus commonly being arranged to operate a cutting knife for cutting the yarn when a fault is detected.

Some kinds of apparatus proposed heretofore have been incapable of distinguishing between thick slubs which are too short to be objectionable and slubs or spinners doubles which, though they may be relatively thin, are objectionable on account of their length. It is an object of the present invention to provide a novel form of apparatus by which a thickness and a length may be selected independently of one another.

In accordance with the present invention, there is provided an apparatus for scanning a yarn or other linear material for the detection of irregularities. The invention comprises a scanning apparatus for the yarn operable to produce an electrical output in the form of a carrier signal amplitude modulated by irregularities in the linear material; a derivation circuit arranged to derive from the modulated carrier signal; output signals corresponding with carrier signal cycles except when the modulated carrier level is reduced by an irregularity exceeding a selected size; a control circuit arranged to provide a control output when the said output signals persist for more than a selected time so that a control output is obtained from the apparatus only in response to irregularities in the linear material which both exceed a selected size and exceed a selected duration at the scanning speed involved. Advantageously the modulated carrier signal has a pulsed configuration.

In an advantageous arrangement, the scanning apparatus is provided with an automatic gain control having such an inertia that long-term changes in the modulated carrier signal substantially fails to affect the mean amplitude of the carrier signal cycles. Such long-term changes arise from numerous causes, the most important being gradual changes in the diameter of the yarn, and changes in conditions affecting the scanning apparatus which are unrelated to the parameters of the material scanned. With optical scanning apparatus (which is preferred), the most important changes in such conditions is the accumulation of dust which reduces the light transmission.

The modulated carrier signal may be derived by two principal alternative arrangements where an optical scanning apparatus is employed.

Firstly the scanning apparatus may have a light source adapted to be flashed at the carrier recurrence frequency by a pulsed power supply.

Secondly the scanning apparatus may have an optical electric transducer of the kind responsive to incident illumination to produce an output which is a function of the incident illumination when biased with a bias voltage, and a bias circuit arranged to bias the transducer with an unmodulated waveform of the carrier signal recurrence frequency.

The bias circuit may simply be one providing half-wave rectified AC of appropriate frequency or a square wave generator. However, with a transducer in the form of a phototransistor or a photodiode of the semi-conductor type, which is a very convenient form of transducer for many applications, it is found that the output signal for a square wave bias tends to have a poor waveform, showing high peaks on the leading edges. The waveform difficulty is avoidable, it is found, by giving the unmodulated waveform a pulsed configuration with a small mark to space ratio, e.g. pulses of about 3 microseconds duration. A typical recurrence frequency is 30 kc. Moreover, the pulse output obtainable is substantially greater than the output obtainable with square waves; it can indeed be ten times as great.

In order to avoid driving difficulties, the bias pulses should preferably be free from sharp leading edges. Pulses obtained by clipping a sine wave to leave peaks which are then amplified are eminently satisfactory.

For best results, the derivation circuit preferably contains a monostable multivibrator or other device operable to give the output signals a constant amplitude.

In a preferred arrangement, the control circuit has a capacitor connected with a source of DC potential via a resistor and with the derivation circuit, and a gating circuit operable to give the control output when the potential on the capacitor passes a critical value, the arrangement being such that the derivation circuit and the source of DC potential affect the potential across the capacitor in opposite senses. The capacitor may be charged by the source of DC potential and discharged by the derivation circuit and the gating circuit arranged to give the control output when the potential across the capacitor rises above a critical value.

Usefully the scanning apparatus has an amplifying device for the modulated carrier signal and the output from the scanning apparatus is connected in series opposition with a further output therefrom which contains an inertia circuit, the further output acting as a reference circuit operable to minimize circuit drift in the amplifying device.

The following description, in which reference is made to the accompanying drawings is given by way of illustration.

In the drawings:

FIGURE 1 is a schematic circuit drawing which shows an apparatus in accordance with the invention;

FIGURE 2 is a diagrammatic drawing of a yarn passing across an illuminated aperture of an optical scanning head used in the apparatus of FIG. 1;

FIGURE 3A shows a relatively small width or diameter slub in the yarn passing across the aperture;

FIGURE 3B is a view similar to FIGURE 3A but showing a relatively large width or diameter slub passing across the aperture;

FIGURE 4b shows the effect of yarn variation on amplifier output;

FIGURE 4c shows the effect of yarn variations on the input to a monostable multivibrator;

FIGURE 4d shows the effect of yarn variation on the output from the monostable multivibrator;

FIGURE 4e shows the input to a gating circuit;

Figure 4A:
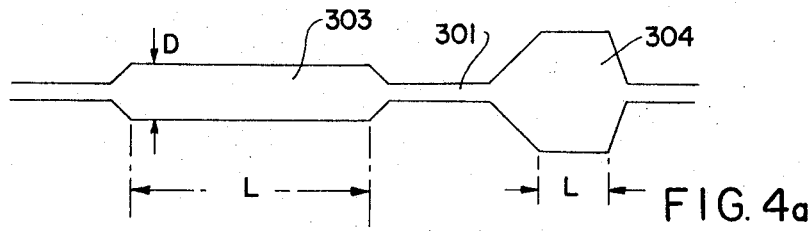
FIGURES 4a to 4e are diagrams showing, in FIGURE 4a a yarn having two thickness variations, one in length and one in width or diameter.
Figure 4B:
Figure 4C:
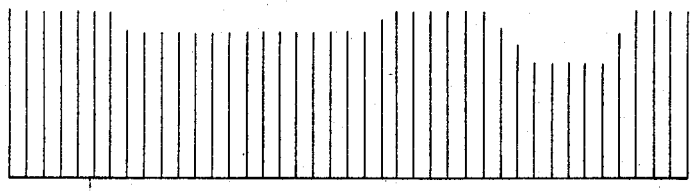
Figure 4D:
Figure 4E:
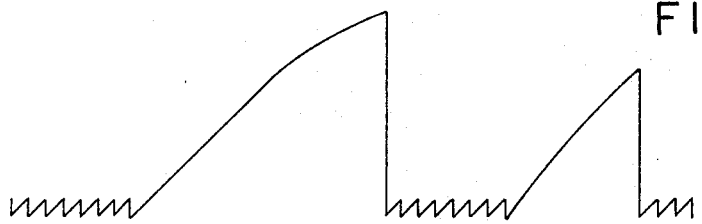

The emitter or light source shown in FIGURE 1 is a semi-conductor device operating at 0.9µ in the infra-red region and pulsed at a repetition frequency of 30 kc. at a pulse width of between 5 and 10 microseconds. The photodiode also peaks at 0.9µ, this arrangement tending to reduce the effects of ambient light.

The output from the amplifier is fed to a transformer having three secondaries, S1, S2, and S3. Secondary S1 feeds into a conventional DC restoration rectifier circuit which supplies an A.G.C. signal for the amplifier, maintaining the average output constant within ±10%. Secondary S2 feeds into a similar circuit, having a long time constant one side of the output of which is connected, in a series opposition arrangement with the output from S3 and a further DC restoration rectifier circuit. The other side of the output of the circuit fed by S2 is connected with a source of variable DC bias indicated as the "fault factor control bias."

The series opposed output is fed to a monostable multivibrator which produces a pulse of fixed amplitude at its output for each incoming pulse which exceeds a certain amplitude. The output pulses are applied to discharge a capacitor C which is charged via a resistor R from a variable DC bias indicated as the "critical length control bias." A gating circuit, e.g. of the monostable multivibrator type, is actuated responsive to the potential of the capacitor C to de-energize a solenoid which allows a knife to operate for cutting the yarn when the said potential reaches a certain threshold level. The gating circuit is arranged to de-energize, rather than energize the solenoid, so that the yarn is cut automatically if the apparatus ceases to operate.

A Schmitt trigger may be used as the gating circuit, but is not preferred as it tends to de-energize the knife solenoid for insufficient time.

Referring now to the FIGURES 4a to 4e it will be seen that when a slub 303 lies across the aperture 302, the illumination reaching the photodiode is reduced to cause a corresponding reduction in the amplitude of the DC restored pulses at the output of secondary S3. Assuming that the diameter of the slub exceeds a critical diameter D determined by the fault factor control bias, no output is obtained from the multivibrator. Accordingly, the charging of the capacitor C through the resistor R is unopposed and the input potential to the gating circuit rises. If the length or duration of the slub is greater than the critical length L determined by the critical length control bias, the circuit is similarly tripped to allow the knife to operate and thereby cut the yarn.

With slubs such as the slub 304 whose length is less than that set by the critical length control bias, the potential on the capacitor C does not rise sufficiently to trip the gating circuit and the knife does not therefore operate.

As will be understood the apparatus has two separate controls which may be set respectively to determine the increase in diameter and the length of slub required to operate the knife. In this way cutting may be avoided in response to slubs which are too short to be objectionable. Moreover, the apparatus is able to distinguish between thin slubs long enough to be objectionable and thick slubs of acceptable shortness.

The two conditions show in FIGURE 3, one involving a long thin slub (1.25 times the mean diameter of the yarn) extending across the aperture, and the other involving the starting of a thick slub (5 times the mean diameter of the yarn) to cross the aperture, may both cause the illumination reaching the photodiode to be reduced by the same amount. However, the two conditions are distinguishable by the apparatus since a fault must persist for long enough to allow the capacitor C to charge before the knife operates.

Obviously the apparatus distinguishes lengths or duration of slubs in the terms of the time during which they reduce the amount of light passing through the aperture and this time depends of course on the yarn speed, which is typically from 250 to 1250 yards per minute. The critical length control bias must therefore be altered if the yarn speed is changed. Advantageously this bias is obtained from a circuit having two controls marked respectively in terms of speed and length.

The function of the multivibrator is to ensure that the pulses reaching the capacitor C are of constant amplitude. Another way in which a similar result may be obtained is to pass the pulse from S2, S3 through a limiter. The pulses S2, S3 may be fed direct to the capacitor C in cases where the length setting is required only to be approximate.

Figure 5:
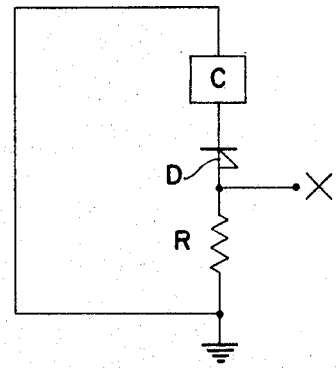
FIGURE 5 shows a modification of the apparatus in which a steady light source is employed and a photodiode is biased with a pulsed waveform.
Figure 6:
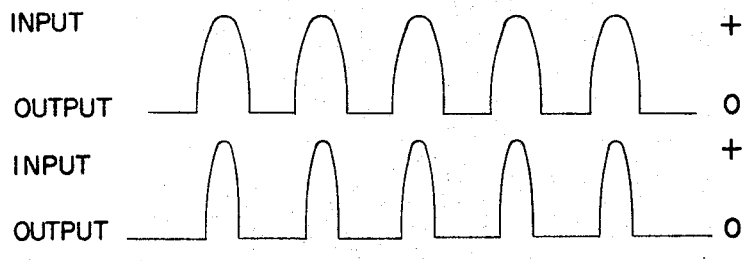
FIGURES 6 and 7 show the input and output waveforms of the photodiode when biased respectively by an input signal of small mark to space ratio and an input of square wave configuration.
Figure 7:
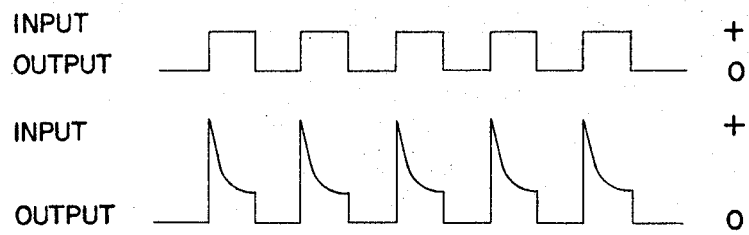

In FIGURE 5 there is shown a photodiode D in series with a bias circuit C and a loading resistor R, typically a 1K resistor. The output waveform obtained at X for a constant level of illumination when the bias circuit provides a short pulse waveform in the form of sinusoidal peaks is shown in FIGURE 6. Typically an output of peak voltage about 1 volt is obtained for a peak bias voltage of 15 volts. FIGURE 7 shows the output waveform when the bias circuit provides a square waveform having the same repetition frequency as the short pulse waveform of FIGURE 6. The circuit of FIGURE 5 has been used successfully with the photodiodes of type numbers 30F2, 31F2, 32F2, 33F2, 34F2, and 35F2 manufactured by Societe Europeanne des Semiconducteurs.

If the circuit in FIGURE 5 is used, the light source driven at the carrier frequency according to FIGS. 1 to 4 may be replaced with a source of constant output.

While this invention has been described with reference to particular embodiments in a particular environment, various changes may be apparent to one skilled in the art and the invention is therefore not to be limited to such embodiments or environment except as set forth in the appended claims.

What I claim is:

1. Apparatus for detecting irregularites in a strand of yarn, comprising means for scanning the yarn at a predetermined scanning speed and operable to produce an electrical output in the form of a carrier signal amplitude modulated by irregularities in the yarn, derivation means arranged to process the modulated carrier signal and provide first output signals corresponding to the carrier signal in response to irregularities in the yarn which fail to exceed a predetermined width and second signals responsive to irregularities exceeding a predetermined duration, and a control circuit arranged to provide a control output when the said first output signals persist for more than said predetermined time interval duration so that a control output is obtained from the apparatus in response to irregularities in the yarn which both exceed said predetermined width and exceed said duration at said scanning speed.

2. Apparatus according to claim 1 in which the scanning means comprises an automatic gain control having such a time dependent characteristic that long-term changes in the modulated carrier signal substantially fail to affect the mean amplitude of the carrier signal cycles.

3. Apparatus according to claim 1 in which the scanning means is an optical scanning apparatus having an aperture of such height and width that signals are produced for yarn irregularities of predetermined width and duration.

4. Apparatus according to claim 1 in which the control circuit includes a capacitor, a source of DC potential, and a resistor, the capacitor being electrically connected to the source via the resistor, the control circuit being electrically connected with the derivation circuit, the control circuit further comprising a gating circuit operable to receive the control circuit output when the potential on the capacitor passes a critical value, the arrangement being such that the derivation circuit and the source of DC potential affect the potential across the capacitor in opposite senses.

5. Apparatus according to claim 4 in which the capacitor is charged by the source of DC potential and is discharged by the derivation circuit, and the gating circuit is operable to receive the control circuit output when the potential across the capacitor rises above a critical value.

6. Apparatus according to claim 1 in which the scanning means includes an amplifying device for the modulated carrier signal, a first output circuit from the scanning means and a second output circuit therefrom having a time delay circuit electrically connected in series opposition with the first output circuit, the second output circuit acting as a reference circuit operable to minimize circuit drift in the amplifying device.

7. Apparatus according to claim 1 further comprising a solenoid operated device for cutting the yarn, with said control output arranged to operate the cutting devise by deenergizing the solenoid.

8. Apparatus for detecting irregularities in a strand of yarn, comprising means for scanning the yarn at a predetermined speed, means responsive to said scanning for producing a signal in response to irregularities in the yarn including first means responsive to signal amplitude thereby identifying irregularities exceeding a predetermined width and second means coupled to receive the output signal from the first said means and responsive to signal duration thereby identifying irregularities exceeding a selected duration at the scanning speed involved and alarm means responsive to the output signal of said second means.

9. Apparatus according to claim 8 in which the scanning means includes optical scanning apparatus, and the alarm means comprises an energized solenoid responsive to said signal and includes means for cutting the yarn upon deenergization of the solenoid.

10. Apparatus according to claim 3 in which the scanning means comprises a pulsed power supply and a light source adapted to be flashed at the carrier recurrence frequency by the pulsed power supply.

11. Apparatus according to claim 3 in which the detecting apparatus comprises a bias voltage, an optical-electric transducer of the kind responsive to incident illumination to produce an output which is a function of the incident illumination when biased with the bias voltage, and a bias circuit arranged to bias the transducer with an unmodulated waveform of the carrier signal recurrence frequency.

12. Apparatus according to claim 11 in which the unmodulated waveform has a pulsed configuration with a small mark to space ratio.

13. Apparatus according to claim 12 in which the pulse duration of the unmodulated waveform is about 3 microseconds.

14. Apparatus according to claim 1 in which the derivation circuit comprises a monostable multivibrator operable to give said output signals a constant amplitude.

References Cited

UNITED STATES PATENTS

| | | | |
|---|---|---|---|
| 2,659,823 | 11/1953 | Vossberg | 250—219 |
| 2,866,376 | 12/1958 | Cook | 250—219 |
| 2,878,395 | 3/1959 | Mindheim | 250—219 |
| 3,001,080 | 9/1961 | Neil | 250—219 |
| 3,116,621 | 1/1964 | Klein et al. | 250—219 |
| 3,283,162 | 11/1966 | Quittner | 250—219 |

RALPH G. NILSON, *Primary Examiner.*

M. ABRAMSON, *Assistant Examiner.*